(12) United States Patent
Lee

(10) Patent No.: US 7,826,460 B2
(45) Date of Patent: Nov. 2, 2010

(54) NETWORK-ON-CHIP APPARATUS, AND METHOD FOR CONTROLLING DYNAMIC FREQUENCY FOR THE SAME

(75) Inventor: Kangmin Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 320 days.

(21) Appl. No.: 11/870,200

(22) Filed: Oct. 10, 2007

(65) Prior Publication Data

US 2008/0084893 A1   Apr. 10, 2008

(30) Foreign Application Priority Data

Oct. 10, 2006   (KR) ...................... 10-2006-0098446

(51) Int. Cl.
*H04L 12/28* (2006.01)
(52) U.S. Cl. .................... 370/395.62; 379/222
(58) Field of Classification Search ............. None
See application file for complete search history.

(56) References Cited

U.S. PATENT DOCUMENTS

| 5,367,534 | A  | * | 11/1994 | Chou et al. ............... 375/222 |
| 6,621,818 | B1 | * | 9/2003  | Szczepanek et al. ........ 370/389 |
| 6,675,314 | B1 | * | 1/2004  | Yamada et al. ............ 713/600 |

| 2003/0219026 | A1 |   | 11/2003 | Sun et al. |
| 2004/0019733 | A1 |   | 1/2004  | Garinger et al. |
| 2006/0064520 | A1 | * | 3/2006  | Anand et al. ............ 710/52 |
| 2006/0182031 | A1 |   | 8/2006  | Tran |

\* cited by examiner

*Primary Examiner*—Phuc Tran
(74) *Attorney, Agent, or Firm*—The Farrell Law Firm, LLP

(57) ABSTRACT

A network-on-chip apparatus including a plurality of network interfaces being independently connected to a plurality of processing elements; a network including a plurality of switches for controlling data transmission/reception between the network interfaces; and a plurality of bidirectional links for connecting between the network interfaces and the switches, and between the switches. The network interface includes an output packet buffer for outputting sequentially stored packets to a corresponding switch via the link connected to an output packet port; an input packet buffer for sequentially storing a packet received from the switch via an input packet port; a packet composer and decomposer for composing a packet using an address signal, a control signal and a data signal received from the processing elements, storing the composed packet in the output packet buffer, decomposing a packet provided from the input packet buffer, decrypting the decomposed packet, and delivering the decrypted packet to the processing elements; and an autonomic clock control unit for controlling a clock frequency being output to the corresponding processing element according to a backlog of the output packet buffer.

10 Claims, 15 Drawing Sheets

NETWORK-ON-CHIP APPARATUS, AND METHOD FOR CONTROLLING DYNAMIC FREQUENCY FOR THE SAME

PRIORITY

This application claims priority under 35 U.S.C. §119(a) to a Patent Application filed in the Korean Intellectual Property Office on Oct. 10, 2006 and assigned Serial No. 2006-98446, the disclosure of which is incorporated herein by reference.

BACKGROUND OF THE INVENTION

1. Field of the Invention

The present invention generally relates to a circuit design method and apparatus for increasing communication efficiency between processing elements connected to a network-on-chip in a system-on-chip and reducing power consumption of each element, and in particular, to an apparatus and its control method for varying dynamic frequencies of processing elements according to the communication pattern and congestion between processing elements connected to a network-on-chip in a system-on-chip.

2. Description of the Related Art

Due to the convergence and thin-and-light trend of Information Technology (IT) devices, System-On-Chip (SOC) technology is developing, in which various high-performance IT devices are integrated into one chip. Among the technologies for realizing SOC, the bus system for connecting several processing elements and enabling their mutual communication has increased in importance. However, with the increase in system integration and the rapid increase in the amount of information exchanged between processing elements, the conventional shared bus structure has decreased in utilization in the high-performance SOC due to the limit of bandwidth. To address the limit of bandwidth and facilitate design of a high-integration high-performance SOC, a Network-On-Chip (NOC) technology has been introduced.

The NOC technology is the next generation on-chip bus technology provided by applying packet or circuit network technology between the general computers or communication devices to a communication structure between processing elements of SOC.

FIG. 1 illustrates a structure of a network-on-chip. Referring to FIG. 1, a NOC 200 generally includes Network Interfaces (NIs) 210 for connecting a plurality of Processing Elements (PEs) 100 connected to a network-on-chip, switches (or routers) 220, and bidirectional links 230 for connecting between the NIs 210 and the switches 220, or among different switches. The topology between the PEs and the switches, or among different switches, is dynamically designed according to an application.

FIG. 2 illustrates a shared bus structure. Referring to FIG. 2, in the conventional shared bus structure, the desired transmission data is initially delivered to all PEs 310 connected to a shared bus 330, and only one corresponding PE among the delivered PEs, or a destination of the corresponding data, selectively receives and stores the data. This data transmission scheme is a point-to-multipoint (or broadcast) transmission scheme in which electric signals are delivered up to the entire region of the bus and up to input ends of all PEs. In this shared bus structure, because only one data burst is transmitted via the shared bus at a time, the limit of the bandwidth is clear, and power is unnecessarily consumed because of the high electric load of the shared bus, so there is a limitation in increasing the operating speed.

However, the NOC with the structure of FIG. 1 has a point-to-point transmission scheme in which transmission data is delivered only via the link selected by the switch. That is, because simultaneous data transmissions are possible via the non-overlapping links, the NOC is noticeably superior to the shared bus structure in transmission bandwidth. In addition, the transmission links have a low electric load since they are basically connected only to the near switches, thereby facilitating an increase in the operating speed of the network. The data transmission unit in the NOC structure is a packet which is similar in form to that in a general network, and its size is appropriately determined according to the applied environment.

The structure of the NOC will now be described in more detail.

FIG. 3 briefly illustrates an NI in terms of data. Referring to FIG. 3, an NI 210 includes a packet composer/decomposer 211, an output packet buffer 212, and an input packet buffer 214.

The packet composer 211 composes a header of a packet based on address and control signals received from a PE 100, configures a payload by binding address and data signals, and makes a composed packet by attaching an error code such as parity to the packet's tail. The packet header contains a variety of information defined in the protocol, and of the information, routing information is most important. That is, the packet header includes a network address necessary for correctly delivering the corresponding packet up to the destination using the routing information. The composed packet is then sequentially stored in the output packet buffer 212.

The output packet buffer 212 outputs the stored packets to the corresponding switch via the link connected to an output packet port 213. In reverse, an input packet received at the NI 210 from the switch via an input packet port 215 is sequentially stored in the input packet buffer 214. A First-In-First-Out (FIFO) buffer can be used as the output packet buffer 212 and the input packet buffer 214.

The packet decomposer 211 sequentially reads the stored packet from the input packet buffer 214, decomposes and decrypts the read packet, and transfers the data to the PE 100.

FIG. 4 illustrates a structure of a packet switch or router. Referring to FIG. 4, a packet switch or router (hereinafter a 'packet switch') 220 generally includes input packet buffers 223, output packet buffers 225, a crossbar fabric 221 for connecting the input packet buffers 223 to the output packet buffers 225, and a crossbar scheduler 222 for controlling the crossbar fabric 221.

The main function of the packet switch 220 is to deliver the packet(s) received from input ports 224 to a particular intended output port 226 based on routing information of the packet header.

The crossbar fabric 221, unlike the conventional shared bus, provides a non-blocking switching function capable of simultaneously delivering several packets to different output ports. If the crossbar fabric 221 receives transmission requests to the same output port simultaneously from a number of different input packet buffers 223, an output conflict happens. In this case, the crossbar fabric 221 unavoidably selects and transmits only one packet among different input packet buffers 223, and a previously non-selected packet among different input packet buffers 223 will be transmitted at the next time after waiting in the input packet buffer. When the output conflict happens, the crossbar scheduler 222 consequently selects only one of the requests. The crossbar scheduler 222 can be implemented with a variety of scheduling algorithms according to an application. Generally, one of a round-robin algorithm of giving the top priority to fairness and a fixed-priority algorithm of following a predefined priority is used. Alternatively, the output packet buffers can be omitted according to an application.

In this packet communication, if transmission of the packet is delayed due to the output port conflict (or output conflict) at the switch node or the packet hot spot at a receiving PE, a packet buffer of each switch node or NI temporarily stores the packet. However, the packet buffer cannot store the packet endlessly because of its finite capacity. Generally, in the computer network (or Internet), when the buffer's capacity is exceeded (Buffer Overflow), a loss of the packet may happen. However, in the system requiring a fast accurate operation, like in the semiconductor device, the packet loss may undesirably result in the serious system latency and failure. Therefore, to prevent the packet loss caused by the buffer overflow, the NOC uses a so-called flow control mechanism.

Generally, link-level flow control scheme, which is simple in realization compared to the 'End-to-End'-level flow control scheme, is used as the flow control scheme. According to this scheme, if a backlog of a certain packet buffer exceeds a predefined threshold, the scheme immediately sends a signal so that a source entity for transmitting a packet to this buffer can no longer send additional packets. This source entity can be either another packet buffer or a PE.

FIG. 5 illustrates an operation scheme of the flow control based on a Back-Pressure signal, in the exemplary case where overflow happens in an input packet buffer of a switch. Referring to FIG. 5, in this scheme, a 1-bit Back-Pressure (BP) signal line (an arrow denoted by a dotted line) exists in parallel with all links, respectively, and a transfer direction of the BP signal is opposite to a packet transfer direction (an arrow denoted by a solid line) of the link. If a threshold of an input packet buffer #1 621 in a switch #2 620 is assumed to be 4, the flow control starts its operation because the current backlog of the input packet buffer #1 621 is 4. Then a HIGH value is carried on the BP signal line connected to a packet buffer whose backlog exceeds the threshold, and as a result, this signal is delivered to an output packet buffer #1 611 of a switch #1 610, which is the sole source that is transmitting a packet to the overflown input packet buffer #1 621. The output packet buffer #1 611 immediately stops the packet transmission until a value of the corresponding BP signal line is LOW. For the time being, the packet received at the output packet buffer #1 611 is continuously stored in the output packet buffer #1 611 as long as its capacity is permitted. After a lapse of a predetermined time, if the backlog of the overflow input packet buffer #1 621 in the switch #2 620 is less than 4, the corresponding BP signal immediately drops to LOW, and upon receipt of this signal, the output packet buffer #1 611 in the switch #1 610 continues to start following packet transmission. In this manner, the scheme prevents the packet loss caused by the packet buffer overflow in the network. In addition, this flow control method prevents overload of the network, thereby facilitating an increase in the entire efficiency of the network.

Meanwhile, when overflow occurs in the output packet buffers of the switch, the crossbar scheduler rejects the packet transmission request to the corresponding output port, thereby preventing the packet transmission conflict to the corresponding output packet buffer. A detailed description thereof will be omitted herein, because it has no close connection to the present invention. Even when overflow occurs in the input packet buffer of the switch connected to the NI, the flow control works according to the same method as the method described in FIG. 5.

FIG. 6 illustrates a flow control method between an NI and a PE. Referring to FIG. 6, if a BP signal to the corresponding output packet port raises to HIGH as congestion occurs in a network connected to the output packet port 213 of the NI 210, the corresponding output packet buffer 212 immediately stops the transmission of the output packet. Regardless of congestion to the network, the output packet buffer 212 continues to store input packets from a packet composer 211, so the output packet buffer 212 increases up to a threshold in its backlog. In this case, the output packet buffer 212 raises the BP signal up to HIGH to notify this fact to the packet composer 211, and the packet composer 211 immediately sends a HOLD signal to the corresponding PE. A transmission path of this signal is denoted by a dotted line. The HOLD signal is provided for stopping any longer packet transmission to the corresponding PE 100. The HOLD signal output from the NI 210 is generally connected to a WAIT input port 111 of the PE 100 when the PE 100 is a microprocessor. When a WAIT signal is asserted (or received), the PE 100 stops all transmission to the NI 210 until the WAIT signal is canceled. In the meantime, the PE 100 not only stops the Data-Out, but also stops the Data-In port 112 in its function because the entire PE stops its operation. Therefore, the packet transmission from the input packet buffer of the corresponding NI to the PE is blocked, and this leads to overflow of the input packet buffer. As a result, a flow control of the input packet buffer happens, so even a smooth network transitions to a congestion state. Due to a series of the network congestions, the network ends in a deadlock state where it can perform no action, and this directly results in a fault of the system. This phenomenon is called a deadlock phenomenon.

The conventional flow control scheme, after stopping the operation of the PE, resumes the operation of the PE if the congestion of the network is released. However, most processors suffer from the latency of at least one cycle or a maximum of several cycles in leaving a WAIT state (or WAIT state of a clock) after entering the WAIT state. In this case, due to the frequent intervention of the flow control (especially when the capacity of the packet buffer is insufficient), the PE frequently switches between the WAIT state and an ACTIVE state, causing an unnecessary demand for the latency. This brings a reduction in the PE performance and the network efficiency.

A method for solving these problems is to sufficiently increase a capacity of the packet buffer, and this is very difficult to pre-estimate the dynamic situation of the complex system in the chip design phase, and is much greater in the area and power consumed by the packet buffer itself compared to the other logic blocks, making it very difficult to provide the sufficient buffer capacity. Therefore, to provide an efficient flow control method at the limited buffer capacity is one of the important tasks of the NOC.

In the conventional flow control scheme of applying the WAIT signal to stop an operation of a PE, even though the PE is in the WAIT state, a clock is still input to the PE. Therefore, the PE, even though it performs no operation, consumes the power due to the clock. That is, when the congestion of the network remains for a long time, the PE continues to consume unnecessary power. There is a clock-gating method for gating the clock of the PE to avoid the power consumption at the clock when the flow control works, and in this method, the foregoing problems may be more serious.

The flow control scheme in the conventional NOC performs no control until overflow occurs in the packet buffers. Therefore, a phenomenon may occur in which most packet buffers of the network are fully filled only with the packets sent by one PE as shown in FIG. 7. In this case, flow control happens in buffers Q1~Q4 due to overflow, so not only is the PE(A) in trouble, but also the PE(B) and PE(C) stop their operations. A way to solve this problem is to reduce the packet outputting frequency of the PE(A) before the packets of the PE(A) occupy all the packet buffers of the network. This is called 'Traffic Shaping' or 'Rate Control' in the general network. However, when this concept (or protocol) is applied intact to the NOC, its realization and control method may be very complex.

SUMMARY OF THE INVENTION

An aspect of the present invention is to address at least the problems and/or disadvantages and to provide at least the advantages described below. Accordingly, an aspect of the present invention is to provide an apparatus and its control method for reducing a risk of the deadlock phenomenon, improving system performance through removal of the unnecessary latency due to frequent ON/OFF of a PE, reducing the power unnecessarily consumed in a WAIT state of the PE due to a network overload, and reducing a capacity of a packet buffer(s) needed in the network with the efficient use of the packet buffer in the design of a complex network-on-chip, thereby reducing the chip size and power consumption.

According to one aspect of the present invention, there is provided a network-on-chip apparatus including a plurality of network interfaces being independently connected to a plurality of processing elements; a network including a plurality of switches for controlling data transmission/reception among the network interfaces; and a plurality of bidirectional links for connecting between the network interfaces and the switches, and among the switches. The network interface includes an output packet buffer for outputting sequentially stored packets to a corresponding switch via the link connected to an output packet port; an input packet buffer for sequentially storing a packet received from the switch via an input packet port; a packet composer and decomposer for composing a packet using an address signal, a control signal and a data signal received from the processing elements, storing the composed packet in the output packet buffer, decomposing a packet provided from the input packet buffer, decrypting the decomposed packet, and delivering the decrypted packet to the processing elements; and an autonomic clock control unit for controlling a clock frequency being output to the corresponding processing element according to a backlog of the output packet buffer.

According to another aspect of the present invention, there is provided a method for controlling a frequency of a clock being input to each of at least one processing element connected to a network-on-chip apparatus. The clock control method includes setting each of clock frequencies being input to the processing elements, to a predetermined initial value, and outputting the set clock frequencies to the processing elements; determining whether an amount of data stored in an output packet buffer, being output from the network-on-chip, has exceeded a predetermined threshold for a predetermined time; if the amount of data has exceeded the threshold, gating the clock being output to the processing element until the amount of data stored in the output packet buffer decreases below the threshold; if the amount of data stored in the output packet buffer has decreased below the threshold, increasing the frequency of the clock being output to the processing element up to a predetermined target frequency, and resetting the target frequency; and if the amount of data stored in the output packet buffer has not exceeded the threshold for the predetermined time, increasing the frequency of the clock being output to the processing element by a predetermined value.

According to further another aspect of the present invention, there is provided a method for controlling a frequency of a clock being input to each of at least one processing element connected to a network-on-chip apparatus. The clock control method includes setting and storing a frequency of a clock being input to each of the processing elements according to a backlog of an output packet buffer for storing data being output to the network; determining whether the backlog of the output packet buffer has exceeded a predetermined threshold; if the backlog has not exceeded the threshold, generating a clock having a clock frequency which is previously set and stored according to a current backlog of the output packet buffer; and if the backlog has exceeded the threshold, gating the clock by setting a frequency of the clock to zero (0).

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will now be described in detail with reference to the annexed drawings. In the following description, a detailed description of known functions and configurations incorporated herein has been omitted for clarity and conciseness.

Figure 1:
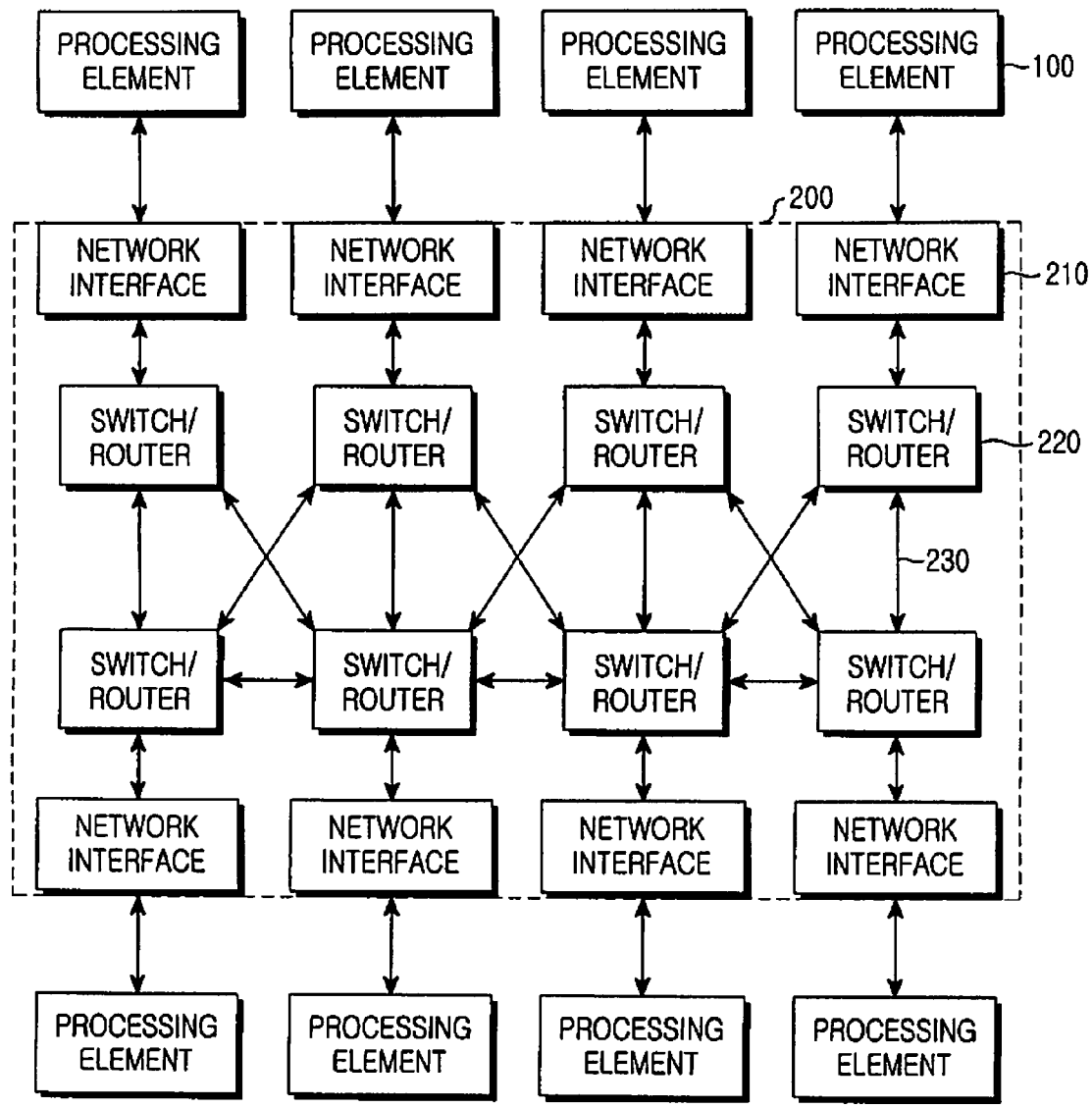
FIG. 1 illustrates a structure of a network-on-chip according to the prior art.
Figure 2:
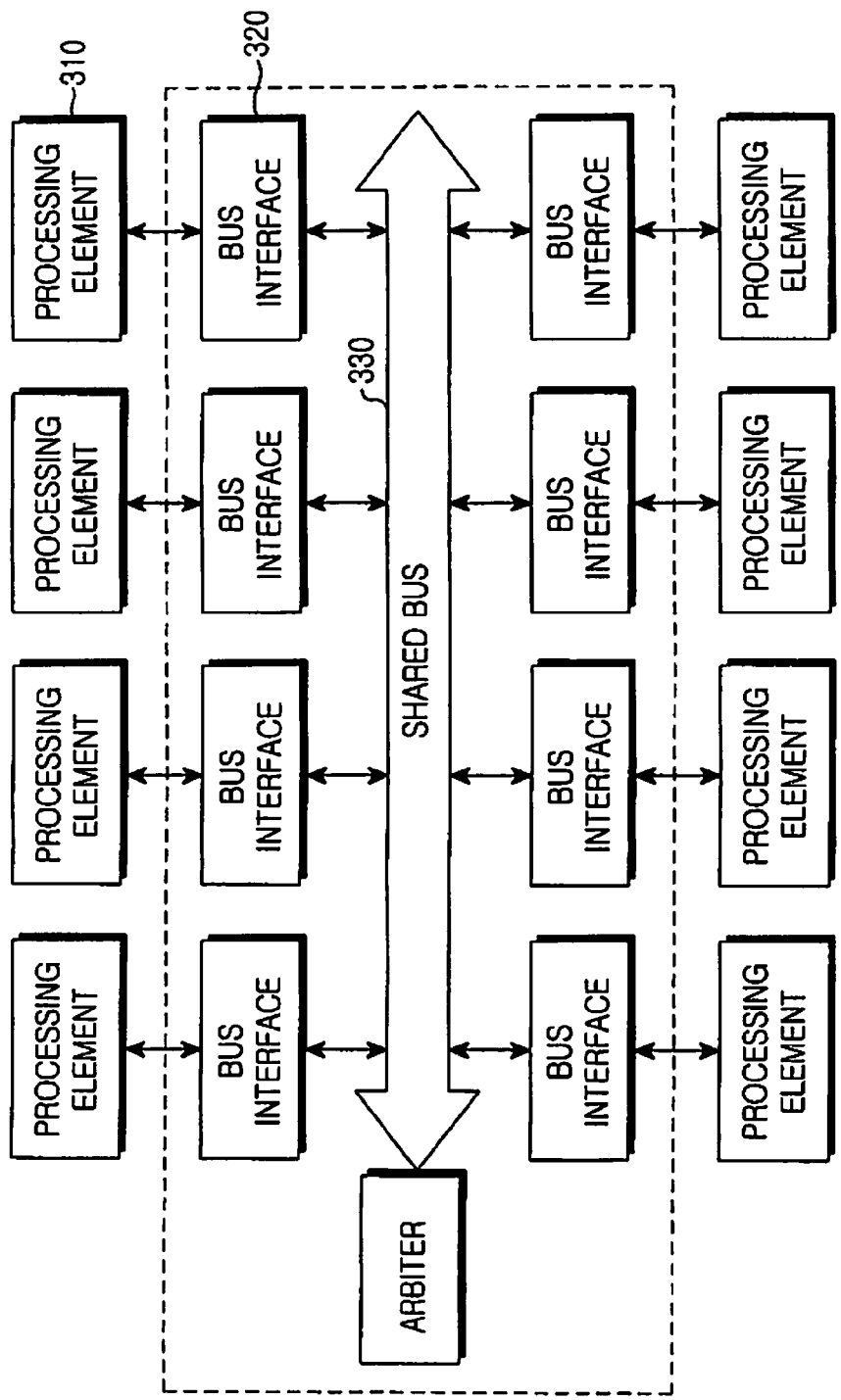
FIG. 2 illustrates a shared bus structure according to the prior art.
Figure 3:
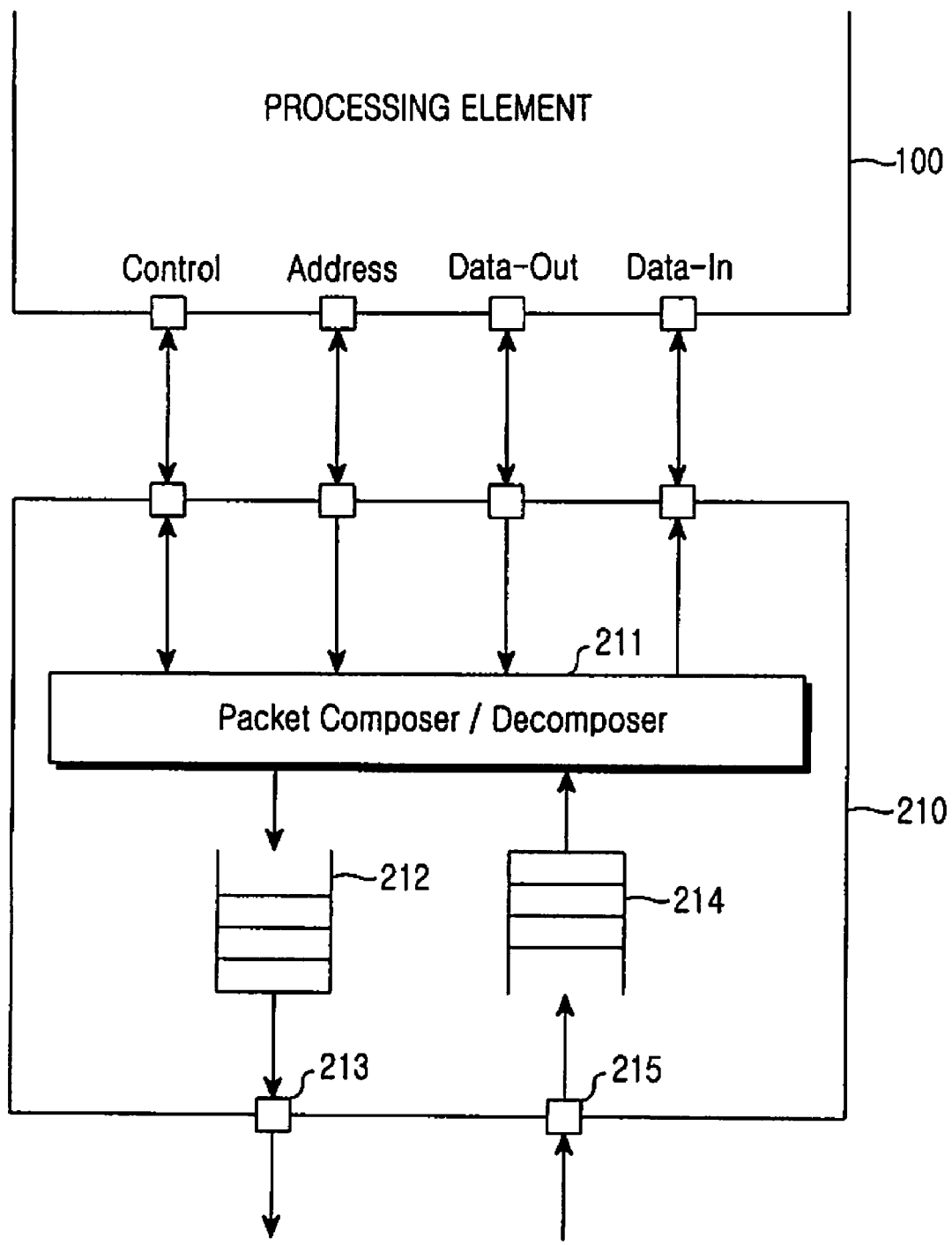
FIG. 3 briefly illustrates a Network Interface (NI) in terms of data.
Figure 4:
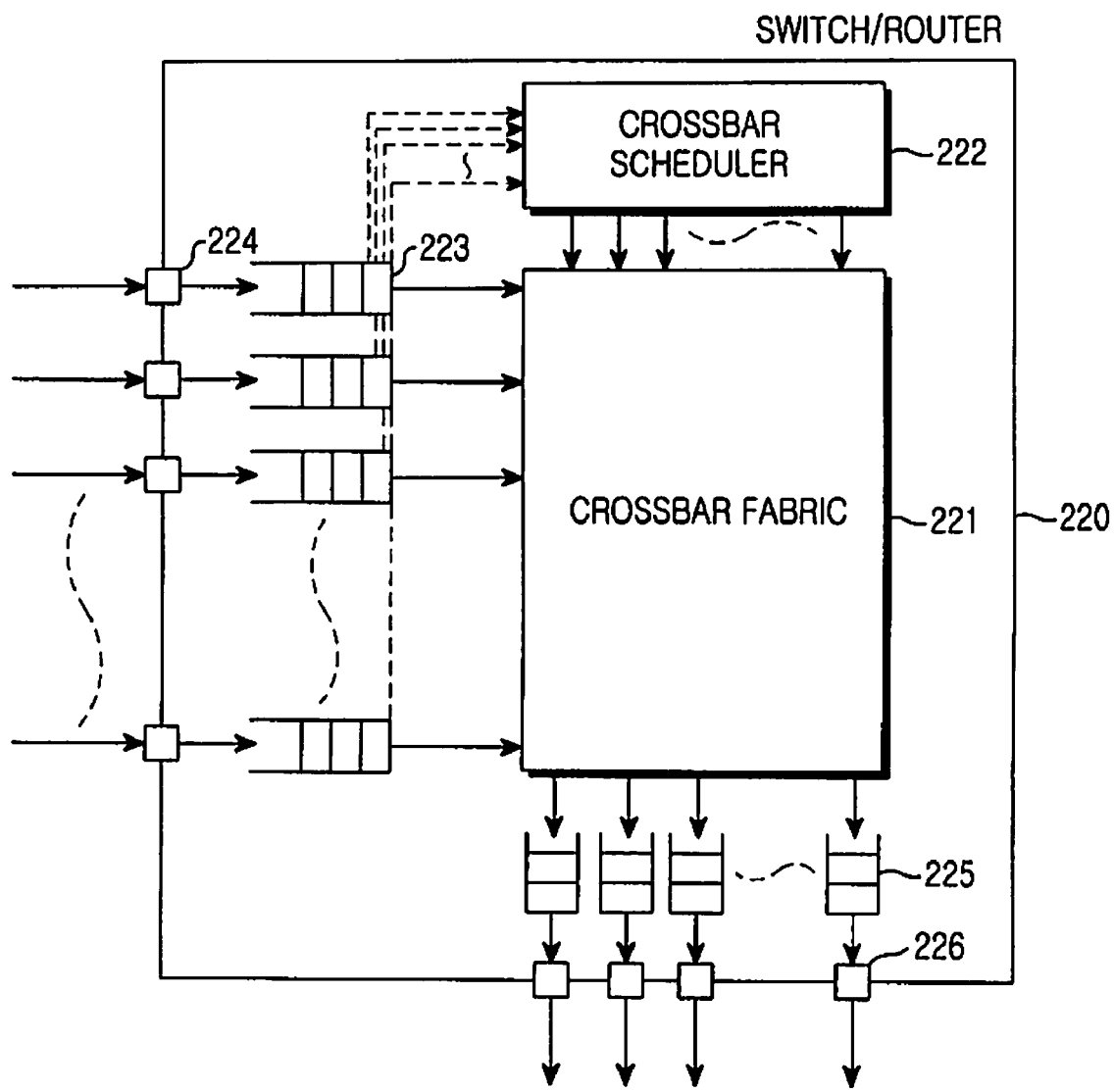
FIG. 4 illustrates a structure of a packet switch or router.
Figure 5:
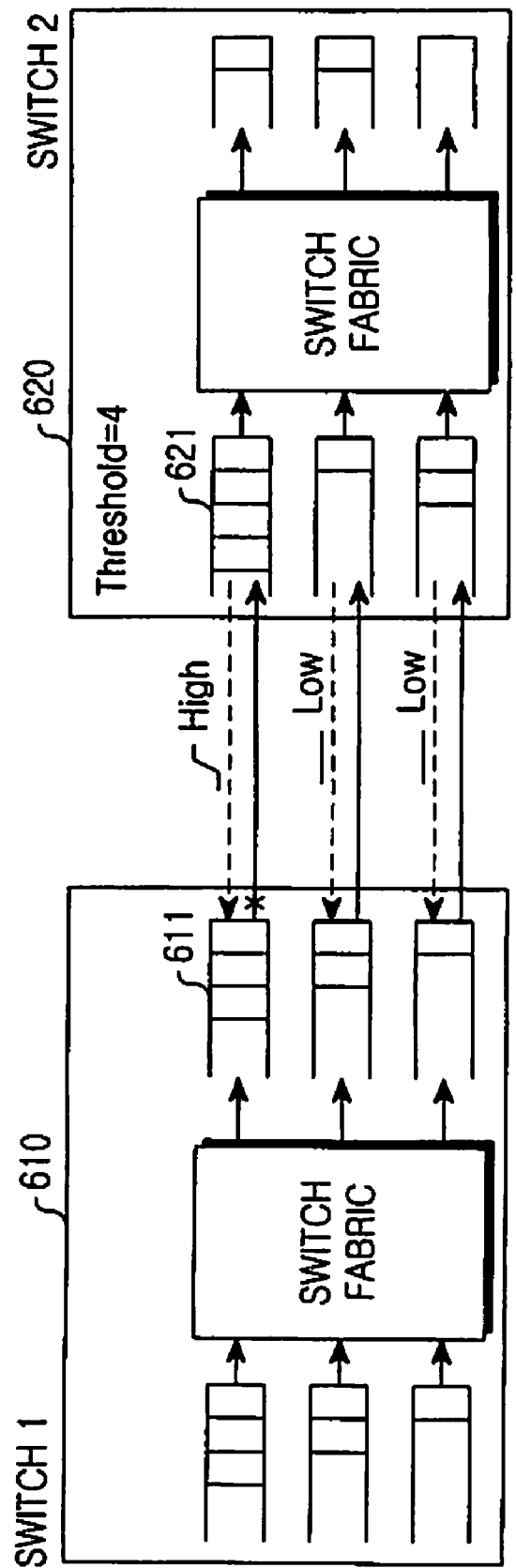
FIG. 5 illustrates an operation scheme of flow control based on a Back-Pressure signal.
Figure 6:
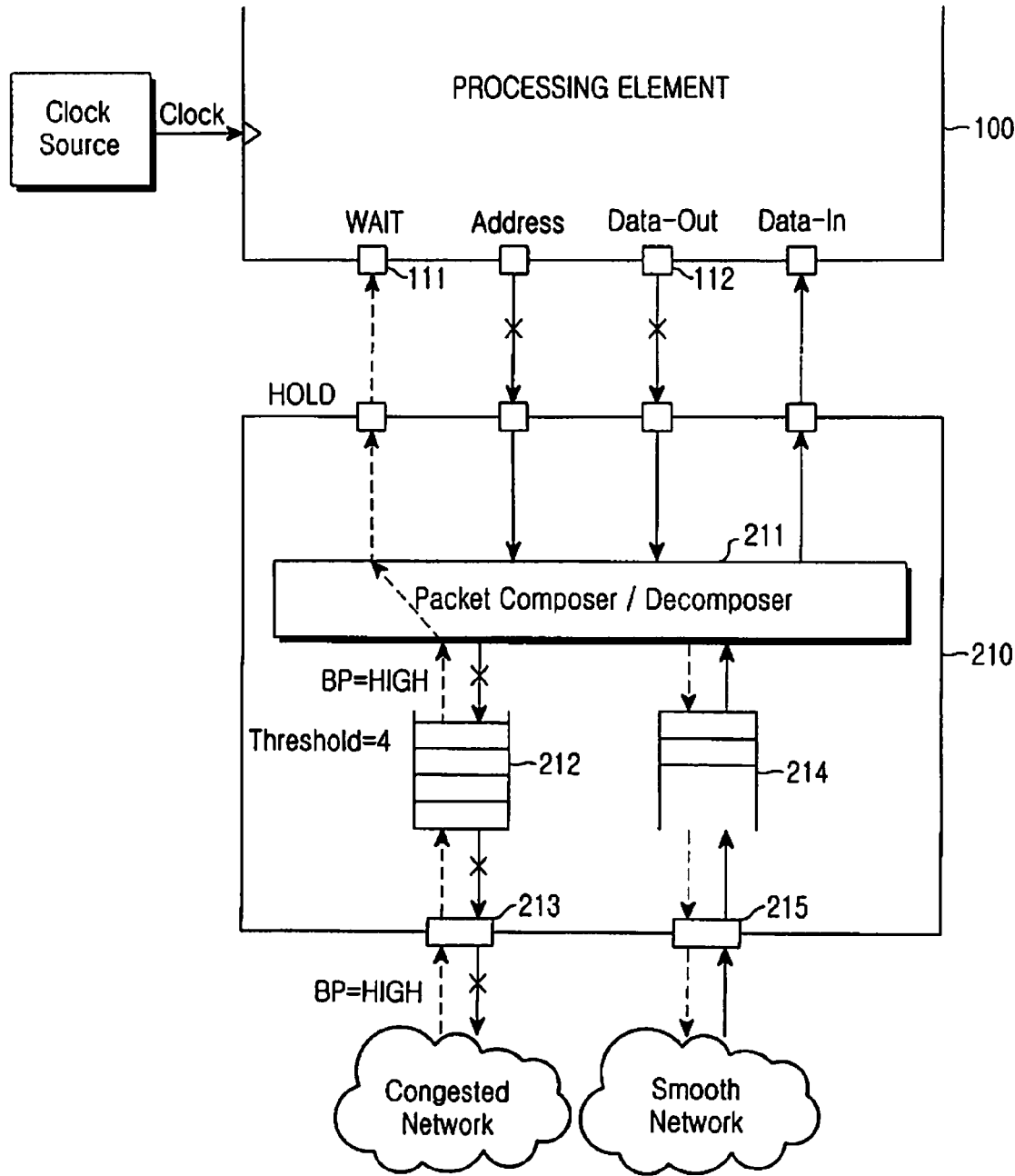
FIG. 6 illustrates a flow control method between an NI and a corresponding PE.
Figure 7:
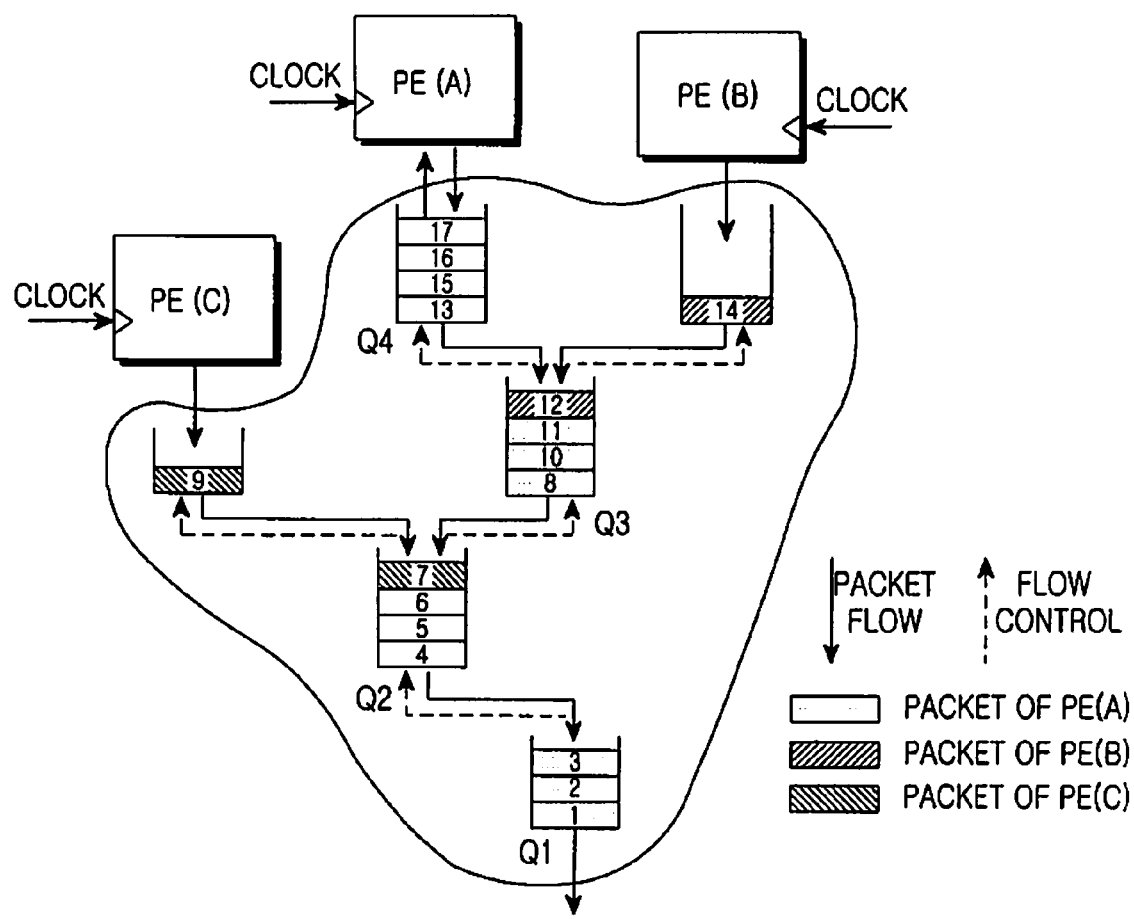
FIG. 7 is diagram given for a description of the problems of the prior art.
Figure 8:
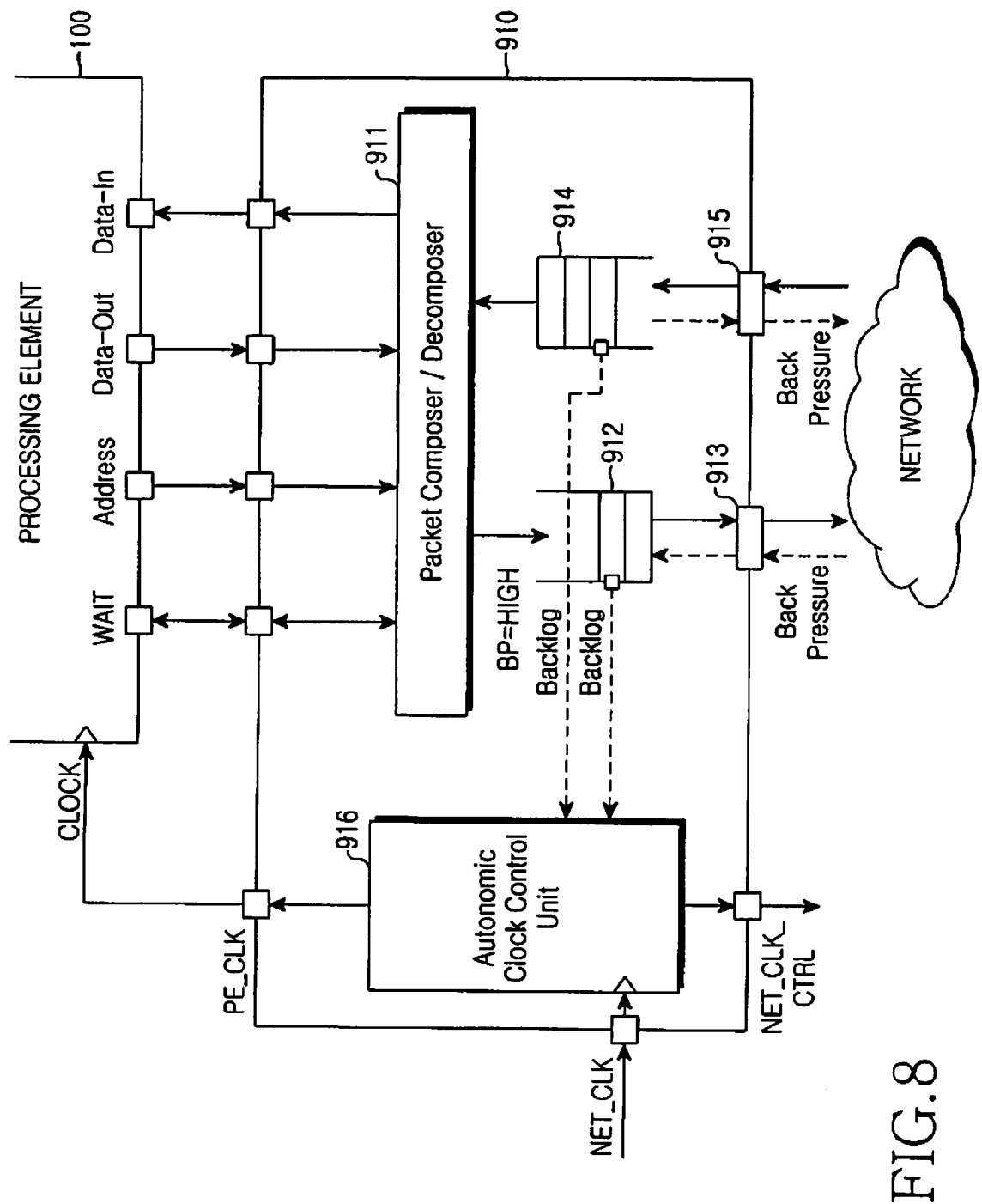
FIG. 8 illustrates a structure of an NI according to an embodiment of the present invention.

FIG. 8 illustrates a structure of an NI according to an embodiment of the present invention. As illustrated in FIG. 8, the present invention newly adds an Autonomic Clock Control Unit (ACCU) 916 to the NI in the conventional network-on-chip. The autonomic clock control unit 916 proposed in the present invention is a digital logic synchronized with a network clock NET_CLK. The autonomic clock control unit 916 receives a backlog of an input packet buffer 914 in the corresponding NI 910 and a backlog of an output packet buffer 912, and outputs a clock PE_CLK of the corresponding Processing Element (PE). Further, the autonomic clock control unit 916 can selectively output a NET_CLK_CTRL for controlling a clock of the network-on-chip.

Figure 9:
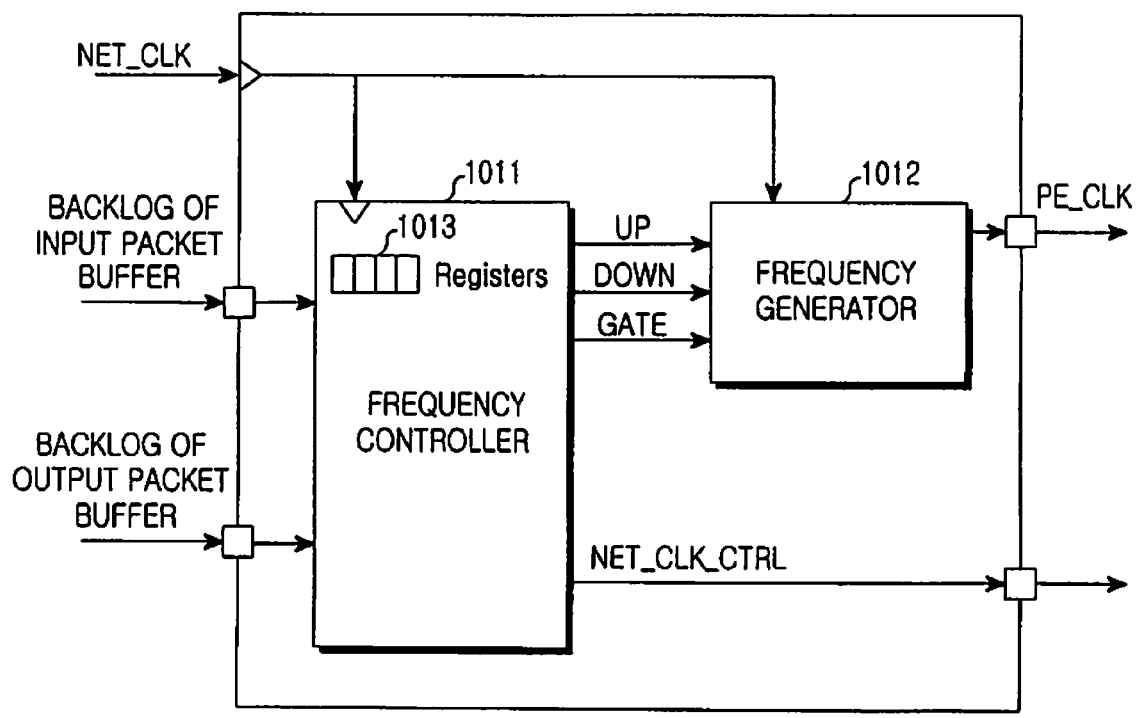
FIG. 9 illustrates an internal structure of an autonomic clock control unit according to an embodiment of the present invention.

FIG. 9 illustrates an internal structure of an autonomic clock control unit according to an embodiment of the present invention. Referring to FIG. 9, an autonomic clock control unit according to an embodiment of the present invention includes a frequency controller 1011 and a frequency generator 1012.

The frequency generator 1012 serves to generate a PE_CLK adjusted according to a control signal (UP and DOWN in FIG. 9) received from the frequency controller 1011. The frequency controller 1011 is a digital logic that finds optimal PE frequency and network frequency based on backlogs of input and output packet buffers.

The frequency controller 1011 includes registers 1013 for storing a threshold of the output packet buffer and a lower threshold Lower-Threshold of the input packet buffer, and values thereof can be realized such that their access and setting is possible by the external processor in the system initialization phase or in real time. Generally, the frequency controller 1011 can be realized with a Finite State Machine (FSM), and the frequency generator 1012 can be simply realized with a frequency synthesizer or a frequency divider.

While the PE uses an independent clock source in the prior art, the present invention finds an optimal PE dynamic frequency depending on the current situation (degree of the congestion) of the network-on-chip and providing this clock to the PE, thereby enabling flow control. Ultimately, the present invention aims at allowing all PEs to operate after finding the optimal frequency determined considering the network situation, thereby increasing the entire system efficiency (for example, performance, power consumption efficiency, chip size reduction (cost reduction) effect, etc). In addition, the present invention aims at varying a clock frequency at an optimal operating speed needed in the network itself (NIs and switches) or the entire system, thereby minimizing the power consumption.

The present invention recognizes the situation of the network (Traffic-Aware) and adjusts an operating speed of each PE connected to the network-on-chip depending on the network situation. In this manner, the smooth flow control and dynamic power management are possible. A detailed description will now be made of an operation of the network-on-chip according to an embodiment of the present invention.

As the system is powered ON, all PEs start their initialization. Here, the clock frequency supplied to the PEs starts with the maximum dynamic frequency where an operation of the PEs is possible. The initial frequency value can be selected according to an application, and this can be set by software in the initialization phase. Each PE initiates an operation with its own maximum dynamic frequency, and exchanges packets via the network. If congestion of the network happens in the process, which can be due to several reasons, a backlog of an output packet buffer in the NI associated with the corresponding PE increases. Due to the increase in the backlog of the output packet buffer, flow control works, and its method can be divided into several methods according to an application.

First Embodiment

According to a first embodiment of the present invention, if a backlog of an output packet buffer exceeds a threshold, a frequency controller sends a GATE signal to a frequency generator, and the frequency generator immediately gates a PE_CLK to stop an operation of a PE. If the congestion of the network is released after a lapse of a predetermined time, a packet in the output packet buffer is transmitted to the network, so the backlog of the output packet buffer decreases below the threshold. Then the frequency controller releases the GATE signal and controls the frequency generator to output again the PE_CLK. Here, a PE_CLK frequency value is set by an algorithm.

Figure 10:
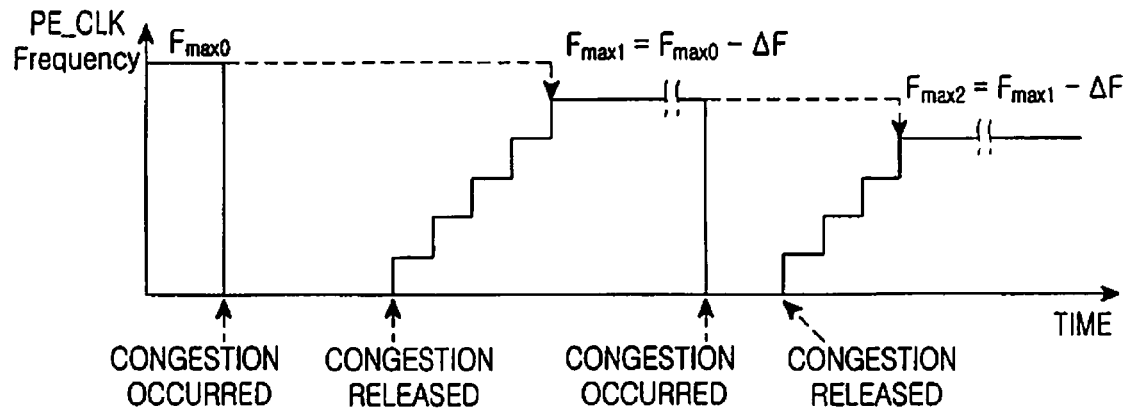
FIGS. 10 to 14 illustrate clock frequency adjustment algorithms according to a first embodiment of the present invention.
Figure 11:
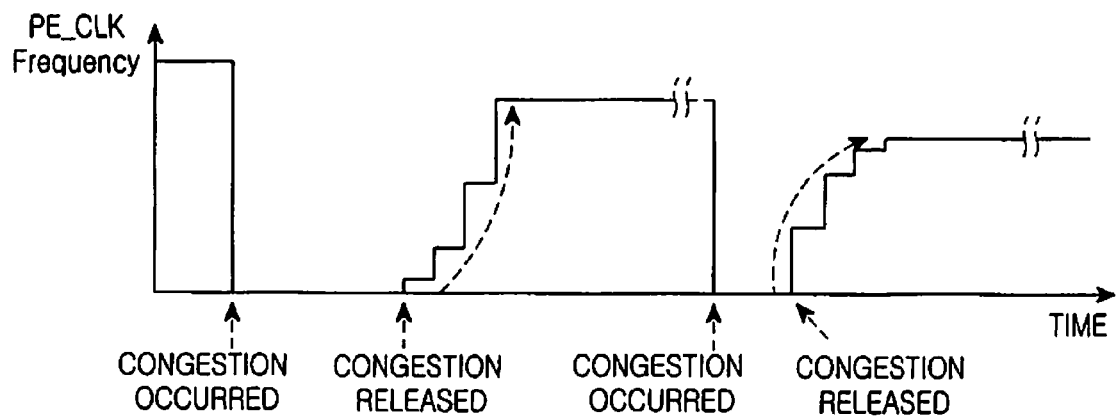
Figure 12:
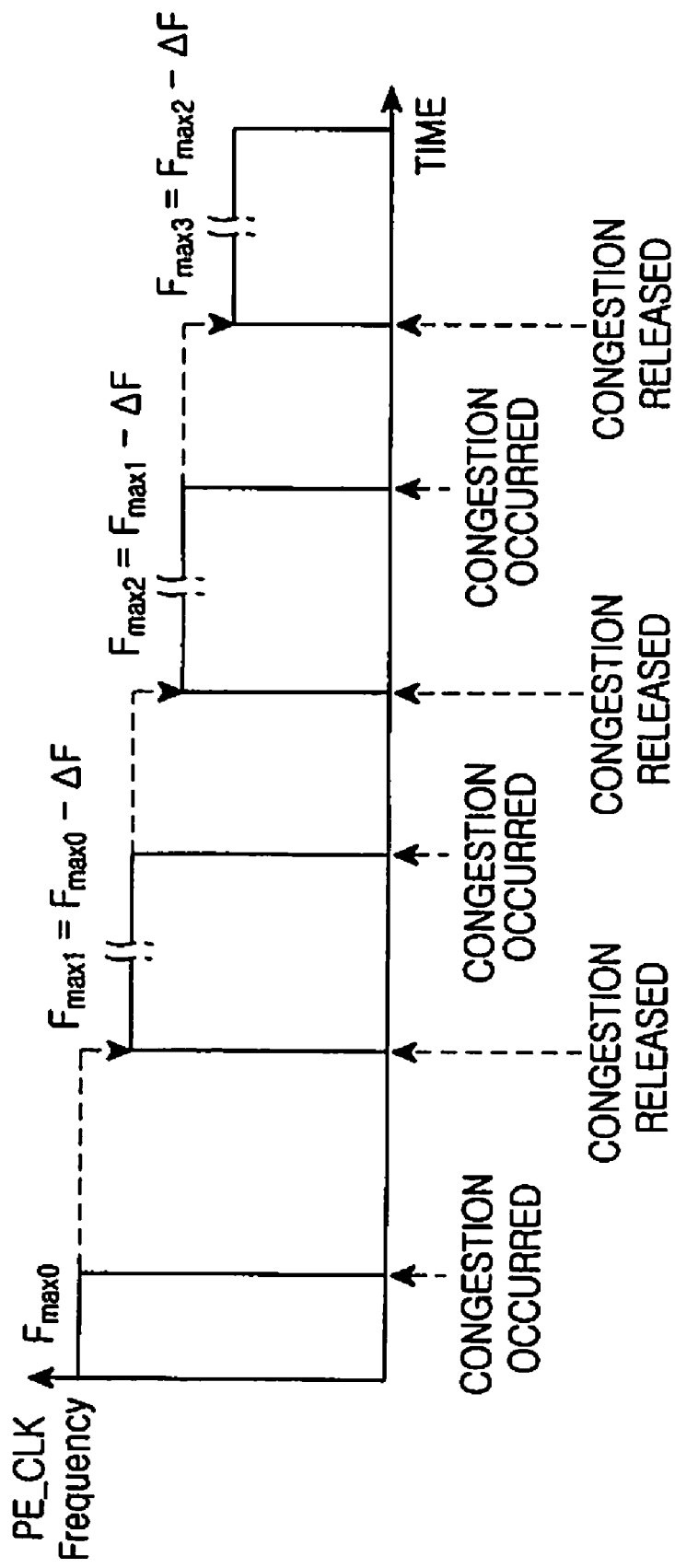
Figure 13:
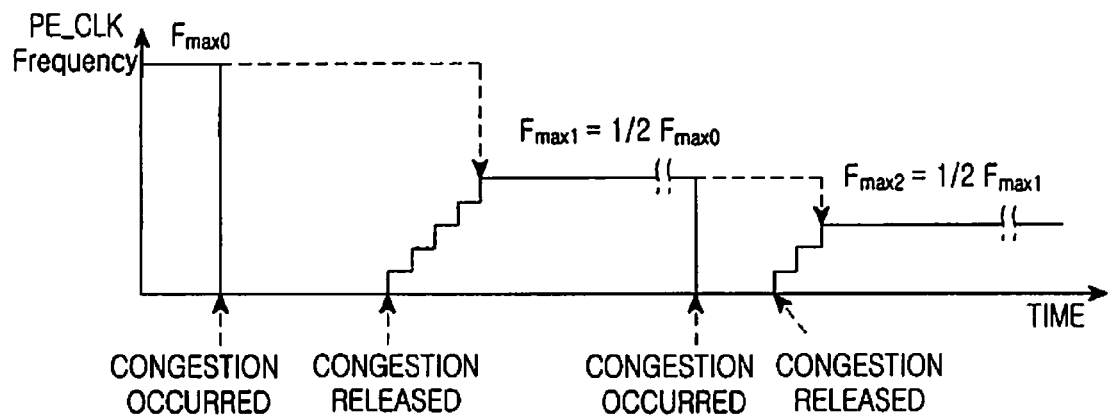

FIGS. 10 to 14 illustrate PE_CLK frequency adjustment algorithms according to the first embodiment of the present invention. Referring to FIG. 10, after the network congestion is released, the frequency generator can linearly increase a PE_CLK frequency value such that it has a predetermined slope from a zero (0) Hz to a particular frequency $F_{max}$. Alternatively, the frequency generator can non-linearly increase the PE_CLK frequency value as shown in FIG. 11, or can raise the PE_CLK frequency value from 0 Hz to $F_{max}$ at a time as shown in FIG. 12. These algorithms can be selected according to an application, and the $F_{max}$ value can also be determined according to application. For example, the frequency generator can set the maximum value of the PE_CLK to the frequency $F_{max0}$ given immediately before the congestion occurs, can set the maximum value of the PE_CLK to the frequency which is lower by one level than the $F_{max0}$ as shown in FIG. 10, or can set the maximum value of the PE_CLK to ½ $F_{max0}$ as shown in FIG. 13.

In the case where no congestion happens for a long time as the frequency $F_{max}$ decreases step by step according to the foregoing algorithm, the network is stabilized or the network is used inefficiently as the $F_{max}$ value is set too low (Under-Utilization). Therefore, if no network congestion happens for a predetermined time (Time-Out), there is a need to increase the network efficiency by increasing a frequency of the PE_CLK step by step.

Figure 14:
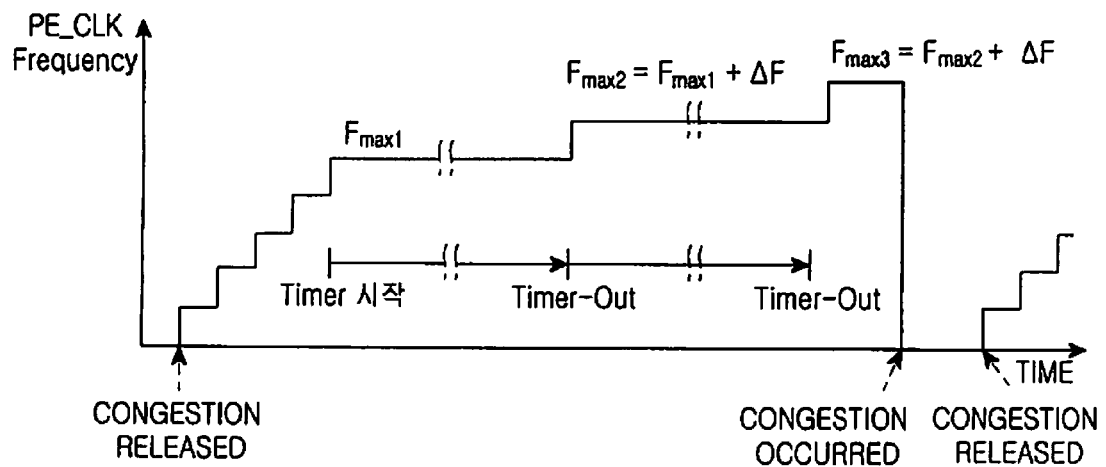

To this end, a timer is realized in the frequency controller, and if no congestion happens for the time set in the timer, the frequency controller can apply an UP signal to the frequency generator, and the frequency generator can increase the frequency of the PE_CLK step by step in response to the UP signal as shown in FIG. 14. Although it is shown in FIG. 14 that the frequency generator linearly increases the PE_CLK frequency value up to the $F_{max}$ after the network congestion is released, the frequency generator can apply the methods of FIGS. 11 to 13.

Figure 15:
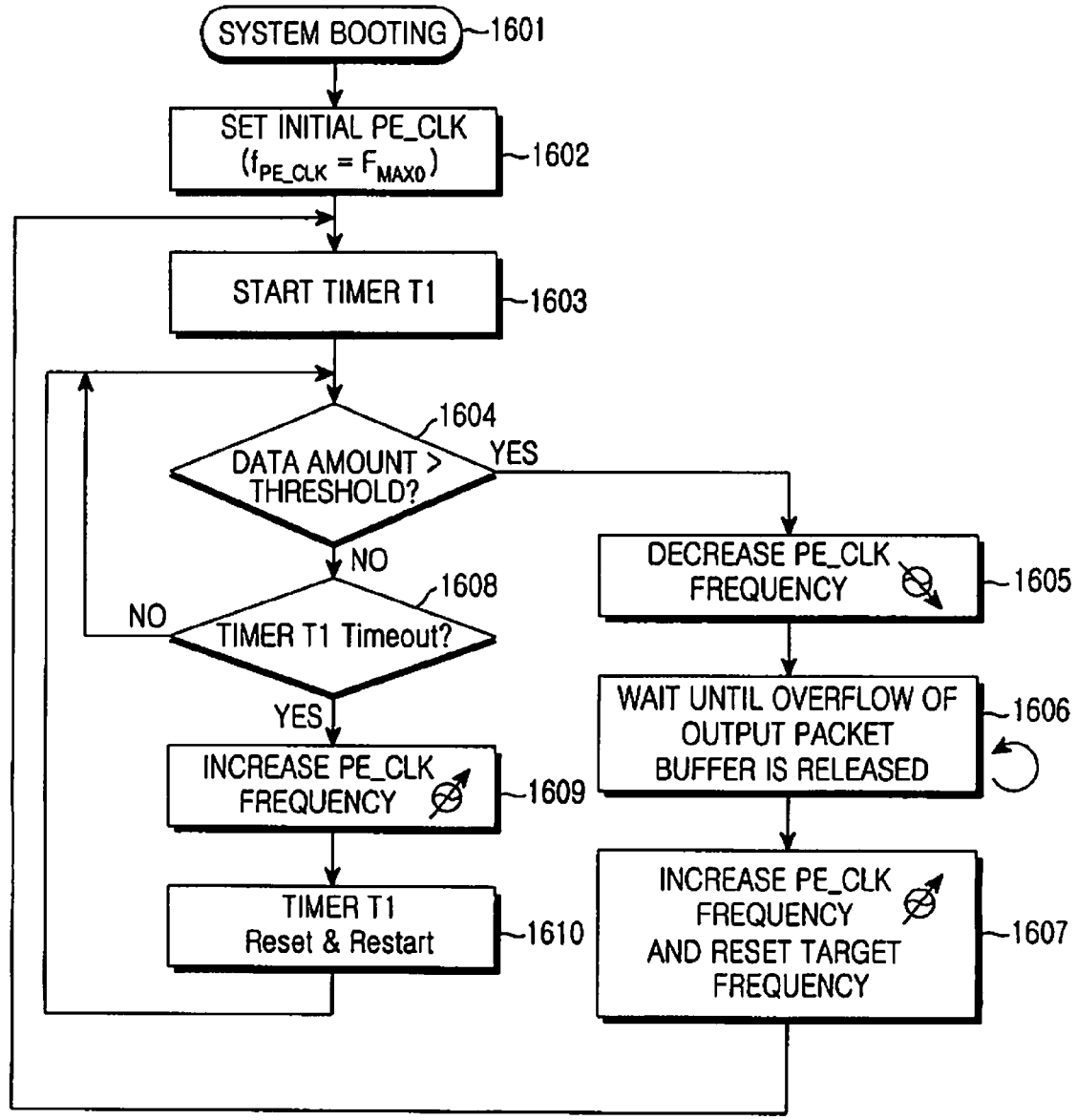
FIG. 15 illustrates a clock frequency setting process according to the first embodiment of the present invention.

FIG. 15 illustrates a clock frequency setting process of a frequency generator according to the first embodiment of the present invention. Referring to FIG. 15, if the system starts booting in step 1601, an initial dynamic frequency of a PE is set to a predetermined value ($f_{PE\_CLK}=F_{max0}$) in step 1602. In step 1603, the frequency generator starts a timer T1. The timer T1 is provided for increasing a frequency of a PE_CLK by one step when the amount (backlog) of data piled in an output packet buffer does not exceed a threshold for the time T1.

In step 1604, the frequency generator determines whether the amount of data piled in an output packet buffer of an NI has exceeded a threshold. If it is determined that the amount of data has exceeded the threshold, the frequency generator gates the PE_CLK to decrease a frequency thereof in step 1605 ($f_{PE\_CLK}=0$). In step 1606, the frequency generator waits until the amount of data piled in the output packet buffer becomes below the threshold, and if the amount of data becomes below the threshold, the frequency generator proceeds to step 1607 where it increases the PE_CLK in the methods shown in FIGS. 10 to 13. If the amount of data exceeds again the threshold in this process, the frequency generator resets a target frequency $F_{TARGET}$ as shown in FIGS. 10 to 13, and if the amount of data does not exceed the threshold and the PE_CLK increases up to $F_{TARGET}$, the frequency generator returns to step 1603.

However, if it is determined in step 1604 that the amount of data has not exceeded the threshold until a timer T1 is over (or timed out) in step 1608, the frequency generator proceeds to step 1609 where it increases the PE_CLK frequency as shown in FIG. 15. In step 1610, the frequency generator resets and restarts the timer T1, and then returns to step 1604.

Second Embodiment

Figure 16:
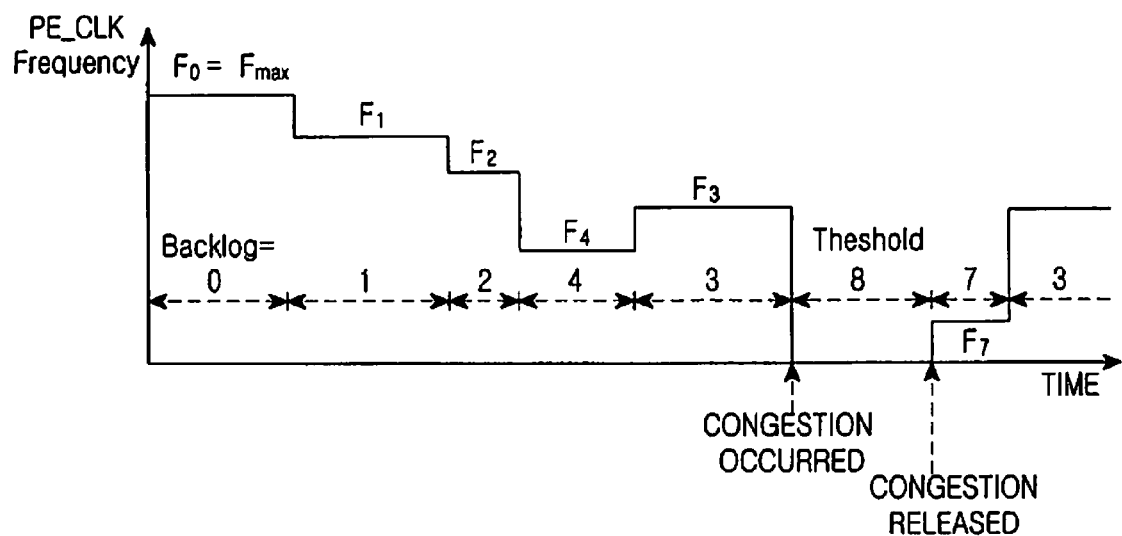
FIG. 16 illustrates a clock frequency adjustment algorithm according to a second embodiment of the present invention.

FIG. 16 illustrates a PE_CLK frequency adjustment algorithm according to a second embodiment of the present invention. Referring to FIG. 16, a frequency generator can previously set and store a clock frequency of a PE depending on a backlog value of an output packet buffer in the form of a mapping table. When the backlog value is zero (0), it means that the network has no congestion. In this case, therefore, the frequency generator increases the frequency of the PE_CLK to the maximum dynamic frequency of the PE. When the backlog value is 1 or 2, the frequency generator decreases the frequency up to the predetermined corresponding level $F_1$ or $F_2$ respectively, and if the backlog reaches the threshold 8 as the congestion happens, the frequency generator gates the PE_CLK to stop an operation of the PE.

Figure 17:
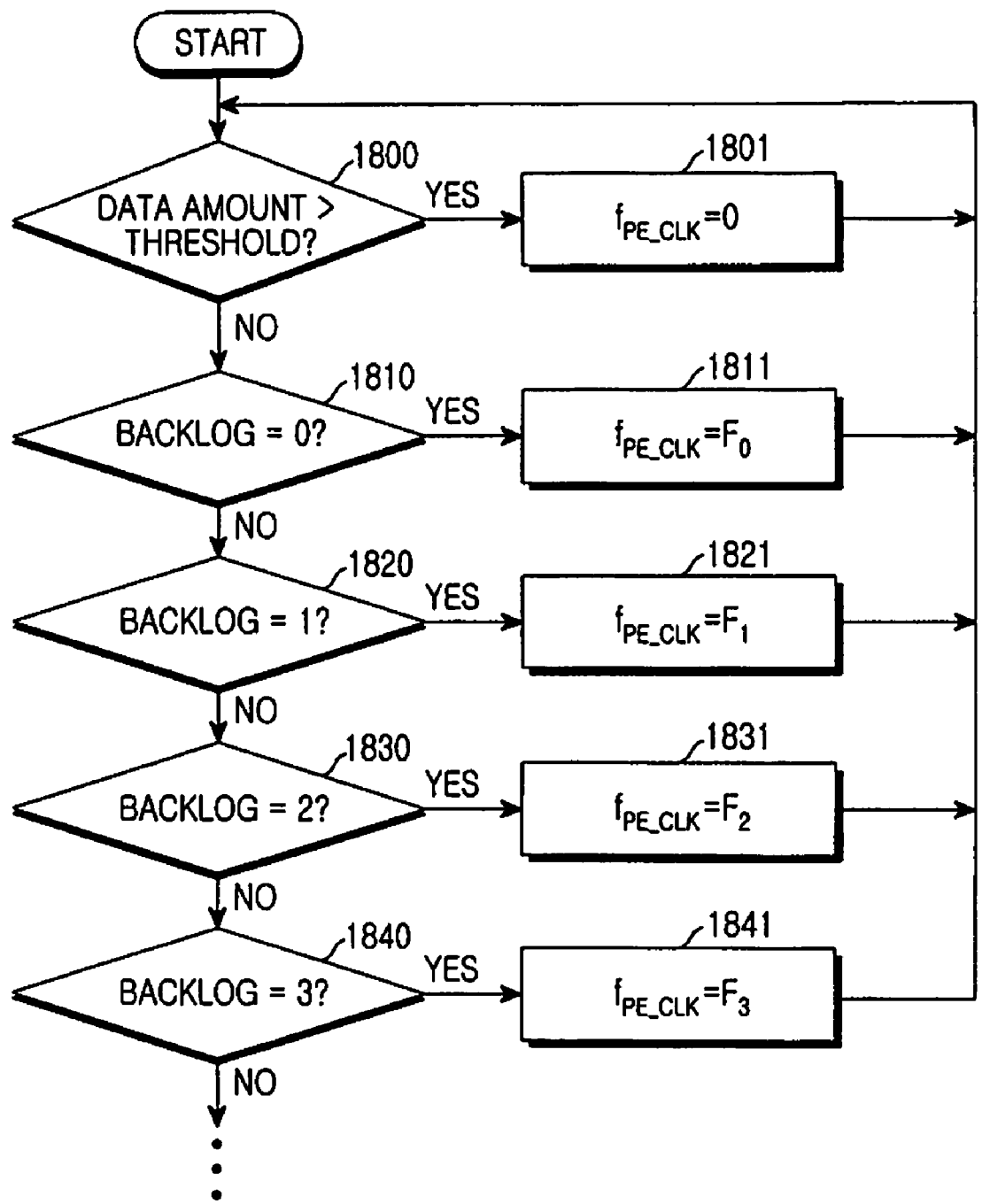
FIG. 17 illustrates a process of setting a clock frequency according to the second embodiment of the present invention.

FIG. 17 illustrates a process of setting a clock frequency according to the second embodiment of the present invention. Referring to FIG. 17, a frequency generator determines in step 1800 whether the amount of data piled in an output packet buffer has exceeded a threshold, and if the amount of data has exceeded the threshold, the frequency generator sets a PE_CLK to $f_{PE\_CLK}=0$ in step 1801.

If it is determined that the amount of data has not exceeded the threshold, the frequency generator determines in step 1810 whether a backlog of the output packet buffer is 0. If it is determined that backlog=0, the frequency generator sets $f_{PE\_CLK}=F_0$ in step 1811. However, if backlog≠0, the frequency generator determines in step 1820 whether backlog=1. In the same manner, the frequency generator determines the backlog of the output packet buffer in step 1830 and 1840, and sets the PE_CLK frequency value to a preset frequency value associated with each backlog value in step 1831 and 1841 respectively.

A description has been made of an operation of the autonomic clock control unit according to an embodiment of the present invention in terms of the flow control. A description will now be made of an operation of the autonomic clock control unit according to an embodiment of the present invention in terms of dynamic power management of the PE.

If a backlog, in use, of an input packet buffer of the corresponding NI is a lower than a predetermined threshold (Lower-Threshold), it can be seen that the PE operates faster than needed, or the network operates slower than needed. In the former case, there is a need to prevent the PE from operating unnecessarily fast by reducing the dynamic frequency of the PE, thereby reducing power consumption. In this case, the frequency controller sends a DOWN signal to the frequency generator to allow the frequency generator to reduce the frequency of the PE_CLK. However, in the latter case, there is a need to increase the dynamic frequency of the network. In this case, the frequency controller sends a NET_CLK_CTRL signal to allow the frequency generator to increase the dynamic frequency of the network. However, the dynamic frequency of the network should be determined depending on the overall decision because it affects not only the corresponding NI but also all NIs and switches.

Finally, a description will be made of network access latency requirements of the PE.

Unlike a general microprocessor, the processor or logic block designed according to a particular application may have no WAIT signal. When such a PE sends a data request to another PE (for example a memory) via the network (READ ACCESS of the memory), the PE should unconditionally receive data after a lapse of a predetermined latency time (latency in clock cycles). In this case, the packet network, owing to its characteristics, cannot transmit data taking the correct latency time into consideration. This problem can be simply solved with use of the clock control method proposed in the present invention.

For example, in the case where a PE(A) desires to read data in a PE (memory) via the network, if it is assumed that the latency time should unconditionally be set to 3 cycles, the conventional network-on-chip cannot control such a correct latency time. As a solution for the problem, the present invention controls to gate the clock of the PE(A) for 4 cycles if 7 cycles are needed until the data packet read from the PE (memory) arrives at the NI of the PE(A). As a result, the PE(A) may feel as if the data has arrived from the memory after a lapse of a 3-cycle time. Actually, therefore, it is possible to allow the PE having such a particular requirement to operate like the network-on-chip having an unspecified latency time even though it is of no help for performance improvement.

As is apparent from the foregoing description, the present invention varies a dynamic frequency of the corresponding PE according to the network congestion, thereby allowing the PE to operate with the optimal frequency in the entire system after a lapse of a predetermined variable interval. Therefore, like in the conventional flow control method, the PE can reduce the unnecessary latency time by frequently repeating ON/OFF, contributing to improvement of the entire system performance.

The present invention can decrease the dynamic frequency of the PE rather than stopping an operation of the PE like in the conventional flow control scheme, thereby enabling the seamless operation and thus preventing the deadlock phenomenon of the network system.

In the present invention, each PE operates at the optimal operating speed appropriate for the network situation, rather than operating only with the highest dynamic frequency, thereby decreasing the supply voltage to be suitable to the current operating speed and thus contributing to a reduction in the operation power consumed in the PE.

In the present invention, when the packet buffer capacity in the NI and switch is low, the dynamic frequency of the PE is determined according to the bandwidth supportable in the network, thereby preventing the conventional frequent occurrence of the congestion phenomenon. As a result, the invention can set a capacity of the packet buffer to a low level, contributing to a reduction in the chip size and power consumption.

The present invention can adjust the dynamic frequency of the network according to the amount of data, so there is no need to perform an operation of the network unnecessarily fast, thereby reducing power consumption in the network.

The present invention can support a PE having particular latency requirements through clock controlling.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A network-on-chip apparatus comprising:
   a plurality of network interfaces being independently connected to a plurality of processing elements;
   a network including a plurality of switches for controlling data transmission/reception among the network interfaces; and
   a plurality of bidirectional links for connecting between the network interfaces and the switches, and among the switches;
   wherein at least one of the plurality of network interfaces includes:
   an output packet buffer for outputting sequentially stored packets to a corresponding switch via a link connected to an output packet port;
   an input packet buffer for sequentially storing a packet received from the switch via an input packet port;
   a packet composer and decomposer for composing a packet using an address signal, a control signal and a data signal received from a corresponding processing element, storing the composed packet in the output packet buffer, decomposing a packet provided from the input packet buffer, decrypting the decomposed packet, and delivering the decrypted packet to the plurality of the corresponding processing element; and
   an autonomic clock control unit for controlling a clock frequency being output to the corresponding processing element according to a backlog of the output packet buffer,
   wherein the autonomic clock control unit comprises:
   a frequency controller for detecting a processing element's frequency according to the backlog of the output packet buffer; and
   a frequency generator for adjusting a clock frequency of the processing element according to a control signal received from the frequency controller.

2. The network-on-chip apparatus of claim 1, wherein the autonomic clock control unit:
   gates the clock if the backlog of the output packet buffer exceeds a predetermined threshold; and
   after a lapse of a predetermined time after the clock is gated, re-outputs the clock if the backlog of the output packet buffer is below the threshold.

3. The network-on-chip apparatus of claim 1, wherein the frequency controller comprises a register for storing the predetermined threshold of the output packet buffer's backlog.

4. The network-on-chip apparatus of claim 3, wherein the frequency controller outputs a control signal for controlling an operation of the frequency generator if the backlog of the output packet buffer exceeds the predetermined threshold; and
   wherein the frequency generator gates the clock being output to the processing element according to the control signal.

5. The network-on-chip apparatus of claim 4, wherein after a lapse of a predetermined time after the clock is gated, the frequency controller outputs, to the frequency generator, a control signal for controlling to re-output the clock if the backlog of the output packet buffer is below the threshold.

6. A method for controlling a frequency of a clock being input to each of at least one processing element connected to a network-on-chip apparatus, the method comprising:
   setting each of clock frequencies being input to the processing elements, to a predetermined initial value, and outputting the set clock frequencies to the processing elements;
   determining whether an amount of data stored in an output packet buffer, being output from the network-on-chip, has exceeded a predetermined threshold for a predetermined time;
   if the amount of data has exceeded the threshold, gating the clock being output to the processing element until the amount of data stored in the output packet buffer decreases below the threshold;
   if the amount of data stored in the output packet buffer has decreased below the threshold, increasing the frequency of the clock being output to the processing element up to a predetermined target frequency, and resetting the target frequency; and
   if the amount of data stored in the output packet buffer has not exceeded the threshold for the predetermined time, increasing the frequency of the clock being output to the processing element by a predetermined value.

7. The method of claim 6, wherein the increasing of the clock frequency up to a target frequency comprises:
   linearly increasing the clock frequency so that it has a predetermined slope.

8. The method of claim 6, wherein the increasing of the clock frequency up to a target frequency comprises:
   non-linearly increasing the clock frequency.

9. The method of claim 6, wherein the increasing of the clock frequency up to a target frequency comprises:
   increasing the clock frequency up to the target frequency at a time.

10. The method of claim 6, wherein the resetting of the target frequency comprises:
    setting, as the target frequency, a frequency value less than a clock frequency given immediately before the amount of data stored in the output packet buffer exceeds the threshold.

* * * * *